July 19, 1960 W. M. HUTCHINSON 2,945,344
GAS GENERATOR ADAPTED FOR ON-OFF OPERATION
Filed Oct. 23, 1956 2 Sheets-Sheet 1

INVENTOR.
W. M. HUTCHINSON
BY
Hudson and Young
ATTORNEYS

July 19, 1960

W. M. HUTCHINSON 2,945,344

GAS GENERATOR ADAPTED FOR ON-OFF OPERATION

Filed Oct. 23, 1956

INVENTOR.
W. M. HUTCHINSON

BY Hudson and Young

ATTORNEYS

United States Patent Office 2,945,344
Patented July 19, 1960

2,945,344

GAS GENERATOR ADAPTED FOR ON-OFF OPERATION

William M. Hutchinson, Bartlesville, Okla., assignor to Phillips Petroleum Company, a corporation of Delaware Filed Oct. 23, 1956, Ser. No. 617,882

9 Claims. (Cl. 60—35.6)

This invention relates to a gas generator adapted for on-off operation. In one aspect, this invention relates to a rocket motor adapted for on-off operation. In another aspect, this invention relates to a gas generator or motor employing a solid propellant as a source of power wherein burning of said solid propellant can be extinguished and subsequently reignited.

Gas generators using solid propellants, which when burned, generate large volumes of gas at high pressures can be used for actuating prime movers, starting devices, for propulsion purposes, etc. One type of such a motor has been widely used for propelling rockets and other devices. At the present time, motors using solid propellant as a source of power are being widely used as jet assist take off units ("Jato" units) during take off for heavily loaded aircraft. Such take off assist units are used up in one firing. While it is possible to extinguish and reignite rocket motors employing liquid propellants, suitable means for extinguishing and later reigniting the propellant in motors or gas generators using solid propellants has heretofore been unknown.

It is now discovered that motors employing solid propellants can be extinguished and subsequently reignited by providing said motors with means for cutting through the combustible charge immediately behind the burning front thereof, thereby isolating the remainder of said charge behind said cutting means, thereafter withdrawing said isolation means, and then reigniting said combustion charge.

An object of this invention is to provide an improved gas generator which is adapted for on-off operation. Another object of this invention is to provide an improved rocket motor which is adapted for on-off operation. Still another object of this invention is to provide an improved solid propellant powered motor or gas generator wherein the propellant is capable of being extinguished after being burned for a short time and subsequently reignited when it is desired to again use the motor. Other aspects, objects and advantages of the invention will be apparent to those skilled in the art in view of this disclosure.

Figure 1:
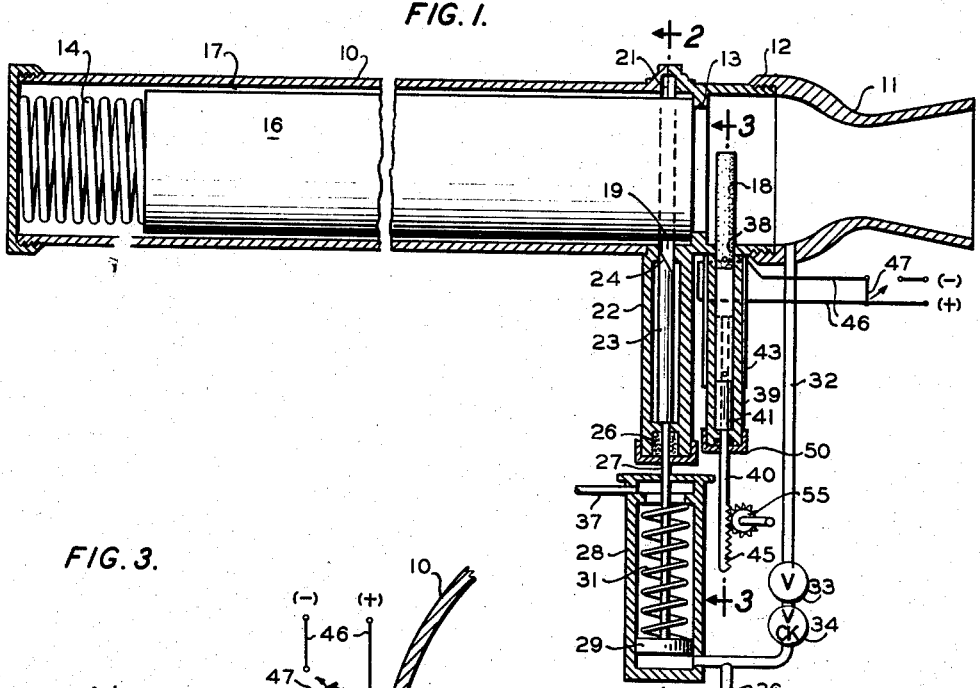
Figure 1 is a view of a rocket motor, partly in cross-section, provided with means for extinguishing the propellant in said motor and subsequently reigniting said propellant.

Referring now to the drawings, the invention will be more fully explained. Like reference numerals have been employed to denote like elements where possible. In Figure 1, there is shown a rocket motor comprising a cylindrical combustion chamber 10 having an axially disposed exhaust nozzle 11 suitably affixed thereto as by threads 12. Any other suitable means can be employed for fixing the exhaust nozzle 11 to the combustion chamber 10. Disposed within said combustion chamber 10, adjacent to and a predetermined fixed distance from said nozzle 11, is a holding means or stop ring 13. Spring biasing means 14 is provided in the opposite end of said combustion chamber 10 from said nozzle 11. Said spring means is affixed in any suitable manner to the end member of said combustion chamber. A solid rocket propellant grain 16 is disposed between said spring biasing means 14 and said holding means 13. A space 17 is provided around said propellant grain so as to equalize the pressure within the combustion chamber. Igniting means comprising a stick of igniter material 18 and means for inserting said igniter material are provided on the other side of said holding means 13 from said propellant 16.

Combustion chamber 10 is provided with a semi-circular opening 19 in the wall thereof. A U-shaped recess 21 is provided in the inner wall of said combustion chamber, the semi-circular portion of said recess being opposite said opening in the wall of said chamber. The leg portions of said recess extend into a housing 22 attached to the outer wall of said chamber 10 around the periphery of said semi-circular opening 19. A cutting member 23 is disposed within said housing 22 and is adapted to be moved through opening 19 and slide in and engage recess 21 as described hereinafter. Said cutting member 23 comprises a D-shaped blade or member having a larger surface area than the inner cross-sectional area of combustion chamber 10. The semi-circular portion 24 of said blade tapers to a sharp edge. Attached to the base of cutting member 23 and extending through a packing gland 26 on the base of housing 22 is a rod 27. The other end of said rod 27 extends into a cylinder 28 and is connected to a piston 29 disposed within said cylinder. Spring means 31 is provided to bias piston 29 into the position shown, i.e., cutting member 23 withdrawn. Gas conduit means 32 having valve 33 and check valve 34 therein extends from said nozzle 11 to said cylinder 28 at a point below the rest position of said piston 29. Conduit means 36 having valve 35 therein extends from said conduit 32 and provides means for releasing pressure in cylinder 28. Vent conduit 37 is provided for venting pressure which may leak past piston 29.

Combustion chamber 10 is provided with a second opening 38 on the other side of said holding means from said first opening 19. A plunger housing 39 is attached to the outer wall of said chamber 10 around the periphery of said second opening 38. A plunger 41 is disposed within said plunger housing. A slot 42 is provided in one side of said plunger housing. A rod 40 having gear teeth 45 on one side thereof is attached at one end to said plunger 41 and extends through a suitable packing gland 50 to without said plunger housing 39. Said gear teeth 45 are adapted to coact with the teeth in crankwheel 55 so as to provide means for actuating plunger 39. Any other suitable means can be employed for actuating rod 40. One such means would be a cylinder arrangement similar to cylinder 28 and piston 29. Another such means would be a solenoid similar to that shown in Figure 5. Attached to said plunger housing around the periphery of said slot is a magazine 43 having spring biasing means 44 disposed therein. A plurality of sticks of igniter material 18 are stored in said magazine 43. Electrical leads 46, extending from a battery or other source of current, not shown, are provided for igniting said igniter material 18. It will be noted that switch 47 in said leads 46 is normally positioned so as to short across the leads and thus prevent electrical charges from building up on the apparatus, which electrical charges might cause the accidental ignition of the igniter materials stored in magazine 43.

Figure 4:
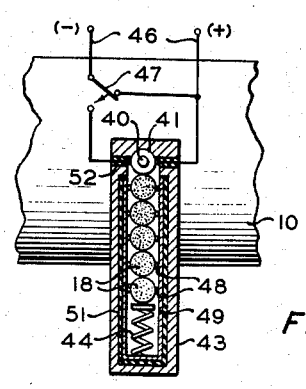
Figure 4 is a view, partly in cross-section, along the line 4—4 of Figure 3 showing details of said means for supplying new igniter material to said motor.

Referring to Figure 4, there is further illustrated the safety means for preventing the accidental ignition of the igniter material stored in magazine 18. Each of said sticks of igniter material is provided with a pair of contact points 48, which when said sticks of igniter material are in magazine 43, are in contact with brass lining strip 49 which lines two sides of said magazine. Said brass strip 49 is separated from the metal of magazine 43 by means of insulation material 51. It will be noted that leads 46 extend through suitable insulators 52 in the wall of magazine 43. Thus, the current from leads 46 can only reach a stick of igniter material which is in firing position in combustion chamber 10.

Figure 3:
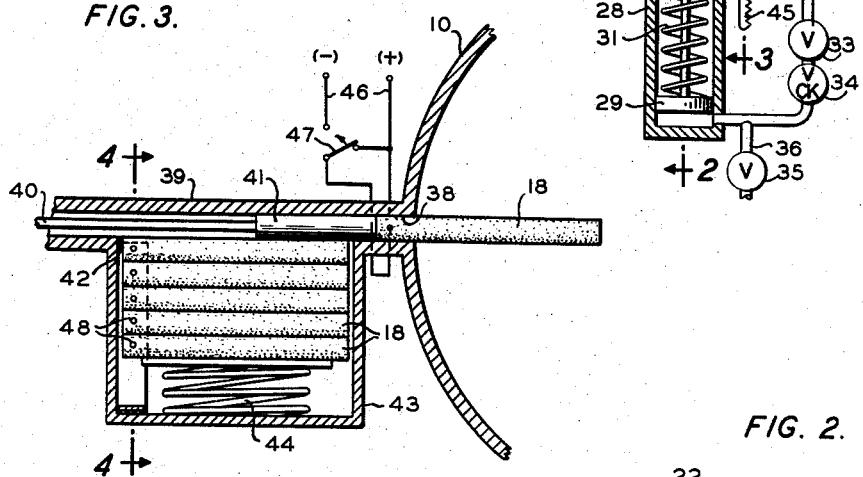
Figure 3 is a view, partly in cross-section, along the line 3—3 of Figure 1 illustrating a means for automatically supplying new igniter material to the motor of Figure 1.
Figure 2:
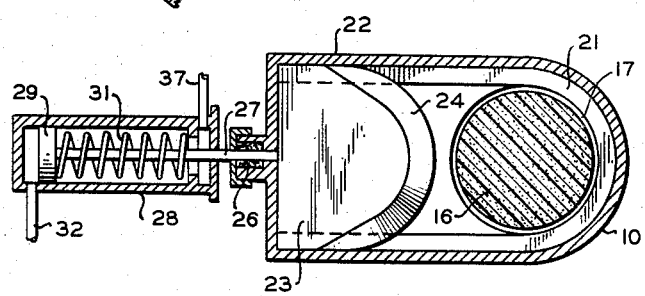
Figure 2 is a view, partly in cross-section, along the line 2—2 of Figure 1 showing the cutting or isolation means of the invention.
Figure 5:
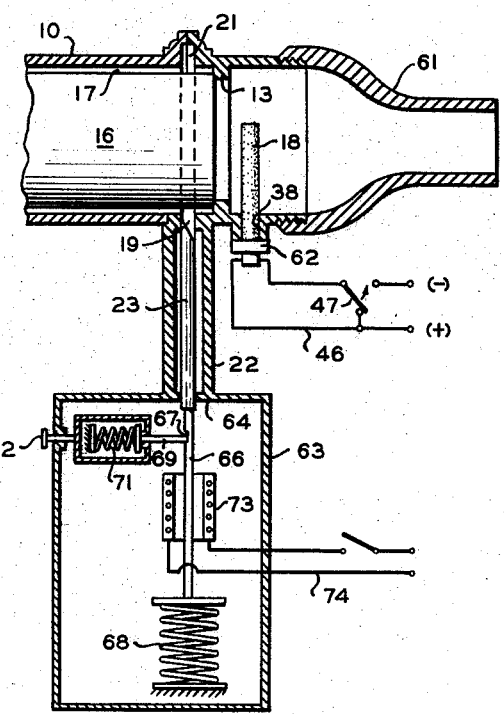
Figure 5 is a view, partly in cross-section, of a gas generator according to the invention and showing another means for actuating and withdrawing the cutting or isolation means of the invention.

Referring to Figure 5, there is shown another modification of the invention wherein axially disposed exhaust nozzle 11 has been replaced with axially disposed exhaust outlet 61. Igniter material 18 extends through said second opening 38 which, in this embodiment, is provided with screw cap fitting 62 instead of plunger housing 39 as in Figure 1. Screw cap fitting 62 has a pair of contact points therein (not shown) which make contact with contact points 48 on the igniter stick 18. However, it will be understood that the mechanism for replacing sticks of igniter material 18 shown in Figures 1, 3, and 4, can also be employed in the modification of the invention illustrated in Figure 5. The remainder of the gas generator shown in Figure 5 is like that shown in Figure 1 except for the means for actuating said cutting member 23. In Figure 5, the means for actuating said cutting member 23 comprises a second housing 63 having at least a portion of one wall 64 integral and common with one wall of said first housing 22. Cutting member 23 is adapted to extend through an opening in said common wall 64 as shown when said cutting member is in a withdrawn position. Rod 66, having a notch 67 therein, is attached to the base of said cutting member 23 at one end and at the other end is attached to spring means 68 suitably mounted within housing 63. A trigger rod 69, adapted to be actuated by spring means 71 and pull button 72, coacts with said notch 67 to hold cutting means 23 and rod 66 in the withdrawn position as shown. Solenoid 73, positioned around rod 66 and actuated by current from leads 74, is provided to withdraw cutting means 23 and rod 66 from the extended position. It will be understood that the means for actuating and withdrawing cutting member 23, which is shown in Figure 1, can also be employed with the gas generator shown in Figure 5.

Figure 6:
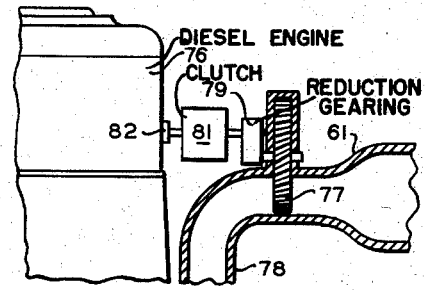
Figure 6 is an illustration of the gas generator of the invention employed as a starting device.

Figure 6 shows the gas generator of the invention adapted for energizing a device 76. Turbine wheel 77 is operatively mounted in exhaust outlet 61 so that the gases generated by the combustion of propellant 16 flow through said outlet and said turbine and are exhausted by means of conduit 78. Turbine wheel 77 is connected through reduction gearing 79 and disengaging clutch 81 to a suitable connection 82 on device 76. Device 76 can be one of any number of devices which it is desired to put into motion quickly and, per se, forms no part of my invention. For this reason, it is merely indicated diagrammatically in the drawing. Device 76 can be, for example, a diesel engine, in which case connection 82 could be the end of the hand crank connection on said engine. If device 76 is a diesel engine, hot exhaust gases from conduit 78 can be directed into the intake manifold so as to help heat the engine, if desired. The reduction gear is a conventional gear train and is commercially available as a unit in a number of gear ratios. The disengaging clutch is commercially availabe such as the starter clutch assembly for automobiles. A magnetic clutch can also be utilized.

Figure 7:
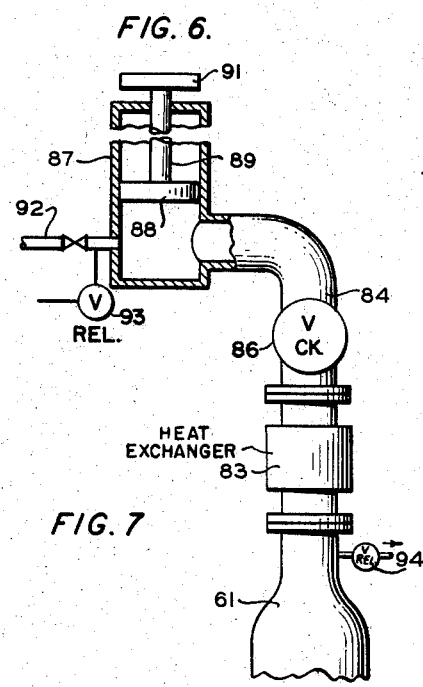
Figure 7 is an illustration of the gas generator of the invention employed as a source of power for an elevating mechanism.

In Figure 7, there is shown in spaced relationship another application of the gas geenrator of the invention as a source of power. Exhaust outlet 61 is connected to conduit 84 having heat exchange means 83 and check valve 86 therein. Heat exchange means 83 can be employed to reduce the temperature of the combustion gases to any desired temperature. Conduit 84 extends to a cylinder 87 having a piston 88 therein adapted to be moved by combustion gases from the burning of the propellant 16 in combustion chamber 10. A rod 89 connected to said piston extends through the end of cylinder 87 and is connected at the other end to a platform 91. Combustion gases pass through conduit 84 into cylinder 87 and cause piston 88 to be moved upwardly thereby moving platform 91 upwardly. This embodiment of the invention is especially applicable when it is desired to hoist heavy materials, such as heavy timbers, which are used in construction projects. Vent conduit 92 is provided for releasing the pressure in cylinder 87 when it is desired to cause platform 91 to be lowered. Release valve 93 is provided in conduit 92 and is set to open at a predetermined maximum pressure for safety reasons. Another relase valve 94 is also provided as a safety measure in exhaust outlet 61.

Figure 8:
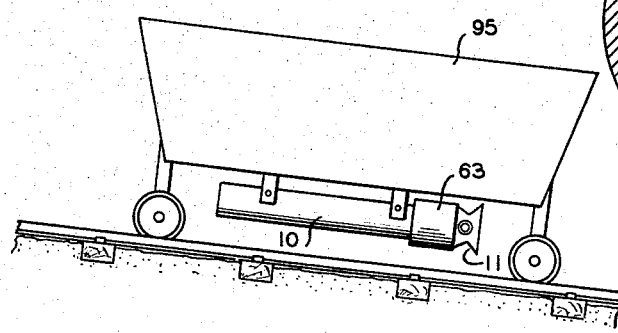
Figure 8 is an illustration showing the use of the rocket motor of the invention for propelling a railroad car or other vehicle.

In Figure 8, there is illustrated an application of the rocket motor of the invention for propulsion purposes. Said rocket motor is attached to railroad car 94 by any suitable means. Car 94 can be any type of railroad car, mine tipple car, or other vehicle. As shown, car 94 is a gondola car and this application of the invention is particularly useful around mines, quarries, wherein a string of such cars are loaded under loading spouts and then transported relatively short distances to either proide room for other cars under said loading spouts or to a dump.

Figure 9:
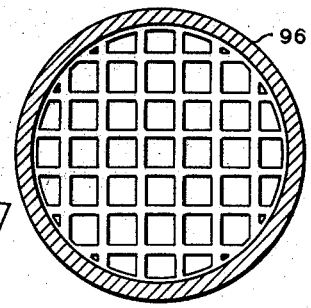
Figure 9 is a view of an alternate holding means which can be employed in the apparatus of Figures 1 and 5.

Figure 9 shows an open work grate 96 which can be used alternately instead of the holding means 13 shown in Figures 1 and 5.

In the operation of the device shown in Figure 1, assuming that said device has been assembled with propellant and igniter material as shown, switch 47 in leads 46 is moved from the position shown and in the direction of the arrow to complete the circuit and cause igniter material 18 to be ignited. Igniter material 18 ignites the end of propellant material 16 adjacent thereto. After the device has operated for the desired period of time, valve 33 in conduit 32 is opened and valve 35 is closed, permitting combustion gases from exhaust nozzle 11 to enter cylinder 28 and actuate piston 29. Said combustion gases thus force cutting member 23 through the grain of propellant material behind the burning front thereof and seats in recess 21 thereby isolating the remaining unburned propellant grain. When it is desired to reignite said propellant, valve 35 in conduit 36 is opened to release the pressure in cylinder 28 and spring means 31 causes the withdrawal of rod 27 and cutting member 23 to the position shown in the drawing. Upon the withdrawal of cutting member 23, spring means 14 pushes propellant grain 16 forward against holding means 13. Plunger 41 is withdrawn either manually or by other suitable means, as described above, and a new stick of propellant material 18 is forced from magazine 43 through slot 42 into plunger housing 39 by the action of spring 44. Plunger 41 is then actuated to force said stick of propellant material 18 into combustion chamber 10 in the ready position shown in the drawing. The device is now ready for another period of firing which can be initiated by closing switch 47 as previously described, after valve 33 is closed.

In the operation of the device shown in Figure 5, assuming the apparatus to be assembled and in the state of readiness there shown, switch 47 is moved to the closed position causing igniter material 18 to be ignited, which in turn ignites propellant material 16 as described in connection with Figure 1. After said propellant material has burned for the desired length of time, pull button 72 is pulled, causing rod 69 to be moved out of notch 67, and spring means 68 forces cutting member 23 through propellant 16 and into recess 21, thereby isolating unburned propellant as described in connection with Figure 1. When it is desired to reignite said propellant, solenoid 73 is actuated by means of current from leads 74, causing rod 66 and cutting member 23 to be withdrawn to the position shown in the drawing. A new stick of propellant material 18 is then inserted through opening 38 and the device is ready for another firing which can be initiated by closing switch 47 as previously described.

Obviously, any suitable propellant material can be employed in the rocket motor or gas generator device of the invention. Examples of suitable propellants are the asphalt base and rubbery base propellants. Such solid propellants comprise a binder or fuel component as the continuous phase having a solid oxidant component, together with or without a suitable burning rate catalyst, dispersed in said binder component. A presently preferred class of solid propellants comprises a solid oxidant, such as ammonium nitrate or ammonium perchlorate, dispersed in a rubbery material, such as a copolymer of a conjugated diene and a vinylpyridine and other substituted heterocyclic nitrogen base compounds. These propellants are produced by mixing the oxidant and copolymer together with suitable curing or quaternizing agents and with or without an appropriate burning rate catalyst. The resulting mixture is then cast, compression molded, or extruded, and then cured to form the solid propellant grain. Solid rocket fuel compositions of this type and a process for their production are disclosed and claimed in copending application No. 284,447, filed April 25, 1952, by W. B. Reynolds et al.

A particularly preferred propellant composition is prepared by combining from about 50 to 90 parts by weight of ammonium nitrate, as the solid oxidant, with 10 to 50 parts by weight of a preferred binder and burning rate catalyst. The burning rate catalyst will usually comprise 0 to 10 parts by weight of the entire composition. Said preferred binder is a rubbery copolymer prepared from a monomer mixture comprising about 25 to 98 parts by weight of butadiene and about 2 to 72 parts by weight of 2-methyl-5-vinylpyridine.

Suitable binder materials also include copolymers of butadiene and styrene, copolymers of butadiene and vinylpyridine, copolymers of butadiene and vinylquinoline, and the like.

Suitable burning rate catalysts include rouge, ammonium dichromate, Prussian blue, Milori blue, and the like.

The gas generator of this invention exhibits advantages which make it very desirable for specialized application such as starting gas turbine engines, and in other specialized applications where short but relatively large bursts of power are required. Such applications include certain elevating or freight lifting operations, door opening operations such as locks on canals, starting of large reciprocating engines, pumping propellants in large liquid rockets, and similar applications. The gas generator of my invention is particularly applicable for starting large reciprocating piston engines in Artic regions where batteries are inoperable.

The following example will serve to further illustrate the invention.

*Example*

A propellant which is composed of 83.5 parts by weight of ammonium nitrate, and 16.5 parts by weight of rubbery binder, said rubbery binder containing 22 parts of carbon black per hundred parts of copolymer in said binder, is burned to furnish the gases for a lifting piston as shown in Figure 7. The rubber in the rubbery binder in this propellant is a 90/10 butadiene/2-methyl-5-vinylpyridine copolymer. It has been found that when such a propellant is burned, the average molecular weight of the combustion gases is 20.25. When the propellant is used to furnish gases for the lifting device of Figure 7, the operating conditions will be:

Gas temperature _____ 800° F. (427° C.)
Operating pressure _____ 800 p.s.i.

Utilizing the perfect gas law, assuming ideality, it is calculated by $pv=RT$ that one gram mol of the combustion gas occupies 1055 cc., or 1055/20.25=52 cc./gm. Since all of the combustion products are present in another form in the solid propellant, it requires the combustion of one gram of propellant to produce 52 cc. of gas. The density of such a propellant is 1.5 grams/cc., thus for every cc. of solid fuel burned, 52 (1.5)=78 ccs. of gases result.

Assuming that piston 88 is 1 foot in diameter, the area=$(6)^2(\pi)$=113 sq. inch. It is also assumed that the load to be lifted by platform 91 will be lifted 8 feet. Therefore, the volume of gas required=8(12)(113)= 10,850 cu. in. Since one cu. in.=16.39 cc., the volume required will be 10,850 (16.39)=178,000 cc. of gas. Thus the volume of solid fuel required=178,000/78= 2280 cc., or, 139 cu. in. Assuming that the propellant grain is 10" in diameter, the area will be $(5)^2(\pi)$=78.5 sq. in. The length of grain to be burned will then be 139/78.5=1.78 inches. The propellants of this type normally have a burning rate at the specified conditions of 0.25 inch/sec. The burning time required to lift platform 91 (with full load) will be 1.78/0.25=7.12 seconds. The maximum load that can be raised by platform 91 will be $800(6)^2(\pi)$=90,500 pounds.

Igniter material 18 can be any suitable igniter material; for example, a grain of gun powder of the type used as propellant in military rifles. Another suitable igniter material comprises a slow burning propellant mixed with a pyrotechnic material. While electrical means have been illustrated for igniting igniter material 18, it will be understood that other means can be employed; for example, a glow plug surrounded by pyrotechnic material.

Variations and modifications of the invention will be evident to those skilled in the art, in view of the above disclosure, without departing from the spirit or scope of the invention.

I claim:

1. A rocket motor, adapted for on-off operation, comprising, in combination: a cylindrical combustion chamber having an axially disposed exhaust nozzle; holding means disposed within said chamber adjacent to and a predetermined fixed distance from said nozzle; spring biasing means in said chamber on the other side of said holding means from said nozzle; a solid rocket propellant grain disposed between said holding means and said spring biasing means; igniting means positioned on the other side of said holding means from said propellant and adjacent to said holding means; cutting means adapted to cut through said propellant grain at a predetermined distance from said holding means and isolate the remainder of said grain of propellant thereby stopping burning of said propellant; and means for actuating said cutting means.

2. A gas generator, adapted for on-off operation, comprising, in combination: a cylindrical combustion chamber closed at one end and having an axially disposed exhaust outlet at the other end; means for biasing one end of a grain of propellant material against a grate adjacent to said exhaust outlet; igniter means on the other side of said grate from said end of said propellant; cutting means operatively connected to said chamber at a predetermined distance from said grate and adapted to be forced through said propellant behind the burning end thereof and isolate unburned propellant behind said cutting means; means for forcing said cutting means through said propellant and thereafter withdrawing same; and means for reigniting said propellant after said cutting means is withdrawn.

3. A gas generator, adapted for on-off operation, comprising, in combination: a cylindrical combustion chamber closed at one end and having an axially disposed exhaust outlet at the other end; holding means within said chamber adjacent said exhaust outlet; biasing means within said chamber for urging one end of a grain of propellant material against said holding means; igniter means located on the other side of said holding means from said end of said propellant material; cutting means attached to and without said chamber adjacent said holding means, adapted to be moved through a semi-circular opening provided in said chamber, cut through said propellant material behind the ignited end thereof, and thereby isolate unburned propellant and stop the generation of gas; means for forcing said cutting means through said propellant and thereafter withdrawing said cutting means; and means for reigniting said propellant after said cutting means is withdrawn.

4. A gas generator, adapted for on-off operation, comprising, in combination: a cylindrical combustion chamber having an axially disposed exhaust outlet; holding means disposed within said chamber adjacent to and a predetermined fixed distance from said exhaust outlet; spring biasing means in said chamber on the other side of said holding means from said exhaust outlet; a solid grain of propellant material disposed between said holding means and said spring biasing means; igniting means positioned on the other side of said holding means from said propellant material and adjacent to said holding means; a semi-circular opening provided in the wall of said chamber adjacent to and on the opposite side of said holding means from said igniter means; a U-shaped recess in the inner wall of said chamber, the semi-circular portion of said recess being opposite said opening and the leg portions of said recess extending into a housing attached to the outer wall of said chamber around the periphery of said opening; a cutting member disposed within said housing, adapted to move within said housing, through said opening, within said recess; and means for actuating said cutting member.

5. A gas generator according to claim 3 wherein said cutting member comprises a D-shaped member having a larger surface area than the inner cross-sectional area of said chamber, and which tapers to a sharp edge around the semi-circular portion thereof.

6. A gas generator according to claim 4 wherein said means for actuating said cutting member comprises: a cylinder; a piston within said cylinder; a piston rod connected at one end to said piston, extending through a wall of said housing and connected at the other end to said cutting member; and gas conduit means connecting said cylinder and said exhaust outlet.

7. A gas generator according to claim 4 wherein said means for actuating said cutting member comprises: a second housing having at least a portion of one wall integral and common with one wall of said first housing; an opening provided in said common wall; spring biasing means within said second housing; a rod connected at one end to said cutting member and at the other end to said spring biasing means; means within said second housing for holding said rod and cutting member in a withdrawn position; means extending without said second housing for releasing said rod and cutting member from said withdrawn position; and means within said second housing for withdrawing said cutting means and said rock into said withdrawn position.

8. A gas generator according to claim 2 wherein said chamber is provided with a second opening on the other side of said holding means from said grain of propellant, and said igniter means comprises: a plunger housing attached to the outer wall of said chamber around the periphery of said second opening; a plunger within said housing; a slot provided in one side of said plunger housing; a stick of igniter material extending into said chamber through said opening and supported in operating position by said plunger when said plunger is in extended position; a magazine attached to said plunger housing around the periphery of said slot; spring biasing means within said magazine for ejecting a stick of igniter material from said magazine into said plunger housing when said plunger is in retracted position; means for actuating said plunger; and means for igniting said stick of igniter material extending into said chamber.

9. A gas generator, adapted for on-off operation, comprising, in combination: a combustion chamber closed at one end and having an exhaust outlet at the other end; a grain of solid propellant material disposed in said combustion chamber; means for biasing one end of said grain of propellant material against a holding means disposed within said combustion chamber adjacent said exhaust nozzle; igniting means adjacent said one end of said propellant grain; cutting means adapted to cut through said propellant grain at a predetermined distance from said holding means and isolate the remainder of said grain of propellant material in said combustion chamber thereby stopping burning of said propellant; and means for actuating said cutting means.

References Cited in the file of this patent

UNITED STATES PATENTS

| | | |
|---|---|---|
| 1,884,479 | Woolson | Oct. 25, 1932 |
| 2,154,572 | Lansing | Apr. 18, 1939 |